(12) United States Patent
Chun et al.

(10) Patent No.: US 9,053,840 B2
(45) Date of Patent: Jun. 9, 2015

(54) PRINTING PASTE COMPOSITION AND ELECTRODE PREPARED THEREFROM

(75) Inventors: Sang-Ki Chun, Daejeon (KR); In-Seok Hwang, Daejeon (KR); Dong-Wook Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 873 days.

(21) Appl. No.: 13/259,926

(22) PCT Filed: Apr. 8, 2010

(86) PCT No.: PCT/KR2010/002174
§ 371 (c)(1),
(2), (4) Date: Dec. 7, 2011

(87) PCT Pub. No.: WO2010/117224
PCT Pub. Date: Oct. 14, 2010

(65) Prior Publication Data
US 2012/0067617 A1    Mar. 22, 2012

(30) Foreign Application Priority Data
Apr. 8, 2009    (KR) .................. 10-2009-0030421

(51) Int. Cl.
| | | |
|---|---|---|
| H01B 1/22 | (2006.01) | |
| C09D 5/24 | (2006.01) | |
| C09D 5/38 | (2006.01) | |
| C09D 7/00 | (2006.01) | |
| C09D 11/033 | (2014.01) | |
| H01J 9/02 | (2006.01) | |

(52) U.S. Cl.
CPC .. *H01B 1/22* (2013.01); *C09D 5/24* (2013.01); *C09D 5/38* (2013.01); *C09D 7/001* (2013.01); *C09D 11/033* (2013.01); *H01J 9/02* (2013.01); *H01J 2211/225* (2013.01)

(58) Field of Classification Search
CPC ............ H01B 1/16; H01B 1/22; C03C 4/006; C03C 4/14; C03C 12/00; C03C 2214/00; C09D 5/24; C08K 2201/001; H05K 1/0296; H05K 1/092
USPC ................................... 252/512–514
See application file for complete search history.

(56) References Cited

U.S. PATENT DOCUMENTS

| | | | |
|---|---|---|---|
| 5,174,925 A | 12/1992 | Fujii et al. | |
| 7,037,448 B2 * | 5/2006 | Nagai et al. | 252/514 |
| 2007/0052890 A1 | 3/2007 | Sakai | |
| 2009/0008142 A1 | 1/2009 | Shimizu et al. | |
| 2009/0015765 A1 | 1/2009 | Takiguchi et al. | |
| 2009/0042001 A1 * | 2/2009 | Yamakawa et al. | 428/220 |
| 2009/0107707 A1 * | 4/2009 | Yamakawa et al. | 174/257 |

FOREIGN PATENT DOCUMENTS

| | | |
|---|---|---|
| CN | 101151682 A | 3/2008 |
| JP | 4213373 A | 8/1992 |
| JP | 2004-111057 A | 4/2004 |

(Continued)

*Primary Examiner* — Mark Kopec
(74) *Attorney, Agent, or Firm* — McKenna Long & Aldridge LLP

(57) ABSTRACT

A printing paste composition includes a metallic particle of 50 to 90 parts by weight, a binder resin of 2 to 20 parts by weight, a solvent of 2 to 50 parts by weight having a boiling point of 250° C. or more and a swelling property of 5 or less, and a glass frit of 0.1 to 10 parts by weight, and the solvent is tetraglyme or pentaglyme.

4 Claims, 13 Drawing Sheets

(56) References Cited

FOREIGN PATENT DOCUMENTS

| | | |
|---|---|---|
| JP | 2004-143325 A | 5/2004 |
| JP | 2004-319281 A | 11/2004 |
| JP | 2004355933 A | 12/2004 |
| JP | 2006282982 A | 10/2006 |
| JP | 2007071936 A | 3/2007 |
| JP | 2007250892 A | 9/2007 |
| JP | 200919117 A | 1/2009 |
| JP | 2009062523 A | 3/2009 |
| KR | 10-0776133 B1 | 11/2007 |
| KR | 10-2010-0058705 A | 6/2010 |

* cited by examiner

PRINTING PASTE COMPOSITION AND ELECTRODE PREPARED THEREFROM

This application is a National Stage Entry of International Application No. PCT/KR2010/002174, filed Apr. 8, 2010, and claims the benefit of Korean Application No. 10-2009-0030421, filed on Apr. 8, 2009, which is hereby incorporated by reference for all purposes as if fully set forth herein.

TECHNICAL FIELD

This application claims the priority of Korean Patent Application No. 2009-30421 filed on Apr. 8, 2009 in the Korean Intellectual Property Office, the disclosures of which are incorporated herein by reference.

The present invention relates to a printing paste composition and an electrode formed using the same. More particularly, the present invention relates to a printing paste composition including a solvent for a printing paste, the solvent being appropriately controlled for air drying property of solvent (slow drying in air) and blanket swelling properties due to solvent to obtain a printed pattern having excellent printing properties, and an electrode formed using the same.

BACKGROUND ART

Offset printing is based on a printing scheme of first transferring a printing paste from a printing plate to a rubber blanket, and then printing the substrate with the transferred printing paste instead of directly transferring the paste to a substrate. Offset printing may be generally divided into flat type offset printing, in which a printing substrate is installed on a flat plate, and rotary press type offset printing, in which the printing substrate is installed on a cylindrical body. Of the two methods, rotary press offset printing is in general use. The rotary press printing may include a sheet-fed type printing process performing printing on each sheet, and a roll type printing process using a roll of printing paper. A printing unit of the rotary press printing generally includes a cliché, a blanket cylinder (rubber blanket), a pressure drum, an inking device supplying ink to a plate surface and a dampening water supply device supplying water. In the case of offset printing, a picture line is vivid and is printable, even on a substrate that is difficult to directly print to, and a printing method is simplified, while printing costs are cheap and thus usable in various fields. For example, offset printing is usable for electrode pattern formation, a fluorescent pattern formation for a plasma display panel, a color pattern formation for a color filter of a liquid crystal display, or the like.

In the offset printing method, dozens of microns of fine patterns may be formed by taking paste from the cliché through a blanket manufactured of silicon rubber for printing, and then setting the paste to the substrate. Meanwhile, the paste is applied to the cliché to be tens of microns (μm) thick using a doctor blade, and thereafter, a solvent in the paste which is offset printing ink, is dried in air or the solvent in the paste is absorbed into a silicon resin after transferring the paste from the cliché to the silicon blanket. Therefore, when the drying properties of the solvent of the paste in the air are too rapid, transcription properties of the paste from the cliché to the silicon rubber at the time of continuous printing may be deteriorated. In addition, when a swelling property of the silicon rubber due to the solvent is relatively great, the paste is dried in the silicon blanket such that a setting property on the substrate may be degraded, whereby printing quality may be deteriorated.

As such, printing properties, particularly, in continuous printing, depend upon air drying property of solvent and blanket swelling properties due to a solvent among several components constituting an offset printing paste. Moreover, as a printed area is increased such as in a plasma display panel (PDP) electrode printed pattern, a correlation between drying properties relating to the air drying speed of a solvent, and blanket swelling properties due to a solvent and printing quality become more important.

In general, an air drying speed of a solvent has a correlation with a boiling point of the solvent. In offset printing using a printing paste, a terpineol or butyl carbitol acetate (BCA) solvent having a boiling point of 200° C. or more in view of air drying properties of the solvent may be used. In the meantime, blanket swelling properties of the BCA and terpineol are 5 or less, respectively. However, the BCA or terpineol solvent has limitation in printing on an effective area in the case of continuous printing for performing hundreds of printings for a large area of an electrode. That is, an electrode pattern may be deteriorated by the accumulated blanket swelling due to the solvent. In addition, paste is stacked on a cliché due to the relatively rapid air drying properties of the solvent, thus reducing the height of a printed pattern. This phenomenon may be serious, as an interval between electrodes is smaller, and also, electrode pattern linearity may be degraded while causing defects in printing.

Therefore, printing technology able to provide excellent printing characteristics, in detail, excellent linearity, clarity and constant line height and line width, and the like, in the printed pattern, even in the case of multiple continuous printing processes, is required.

DISCLOSURE

Technical Problem

An aspect of the present invention provides a printing paste composition comprising a printing paste solvent having appropriate air drying and blanket swelling properties.

An aspect of the present invention provides a printing paste composition capable of providing excellent printing quality, in detail, excellent straightness (line delineation) and clarity. A printing paste composition for forming a printed pattern of which a line height is not relatively reduced, line width deviation is relatively small and surface resistance is constant, is provided.

Another aspect of the present invention provides an electrode having an excellent printed pattern formed using a printing paste composition according to an embodiment of the present invention.

Technical Solution

According to an aspect of the present invention, there is provided a printing paste composition comprising: a metallic particle of 50 to 90 parts by weight, a binder resin of 2 to 20 parts by weight, a solvent of 2 to 50 parts by weight having a boiling point of 250° C. or more and a swelling property of 5 or less, and a glass frit of 0.1 to 10 parts by weight.

According to another aspect of the present invention, there is provided an electrode formed using the printing paste composition provided according to the embodiment of the present invention.

Advantageous Effects

According to an embodiment of the present invention, a printing paste composition may exhibit excellent printing properties even in the case of multiple repetitive printings using the printing paste composition. That is, linearity and clarity in the printed pattern may be prominent, and further, line height in the printed pattern is not reduced, line width deviation thereof is relatively small and surface resistance thereof is constant. This excellent printed pattern may be provided due to a relatively high boiling point and a relatively low blanket swelling property of a solvent used for a printing paste composition according to an embodiment of the present invention, such that air drying of the solvent on a cliché and swelling of a blanket are suppressed at the time of offset printing. The printing paste composition according to an embodiment of the present invention may be used in printing an electrode of a display panel. In addition, an electrode formed using a printing paste composition according to an embodiment of the present invention may provide excellent printed pattern properties.

DESCRIPTION OF DRAWINGS

The above and other aspects, features and other advantages of the present invention will be more clearly understood from the following detailed description taken in conjunction with the accompanying drawings, in which.

BEST MODE

Figure 1:
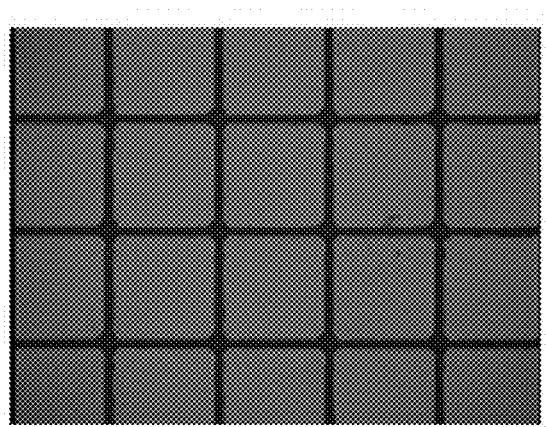
FIG. 1 is a microscope photograph (500× magnification) of a printed pattern (taken at the time of 100 printings) formed using the printing paste composition of Embodiment 4 of the present invention.
Figure 2A:
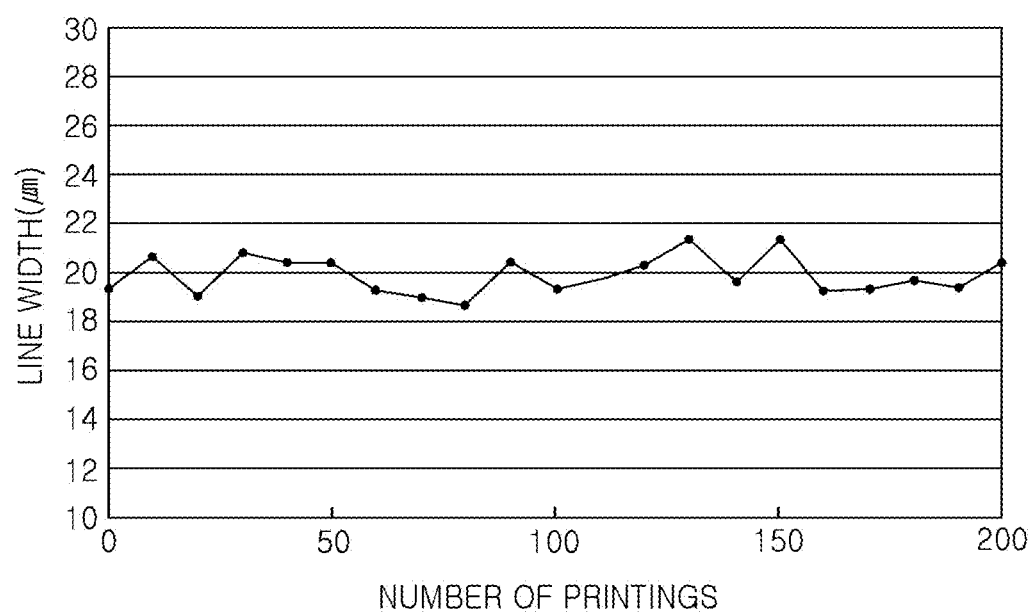
FIG. 2(A) is a graph illustrating a line width change depending upon the number of printings of a printed pattern formed using the printing paste composition of Embodiment 4 of the present invention.
Figure 2B:
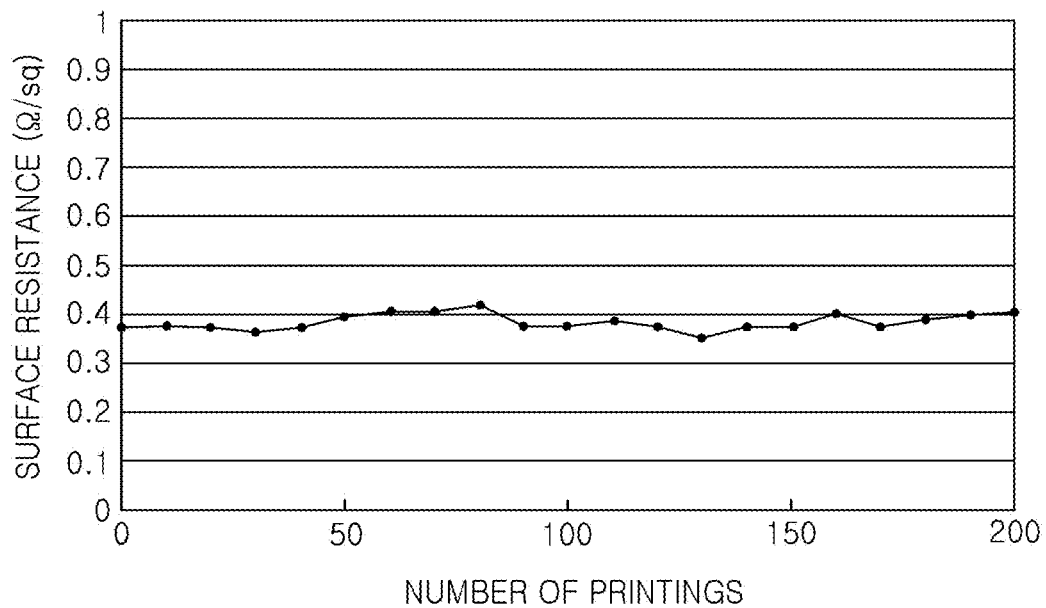
FIG. 2(B) is a graph illustrating a surface resistance change depending upon the number of printings of a printed pattern formed using the printing paste composition of Embodiment 4 of the present invention.
Figure 3:
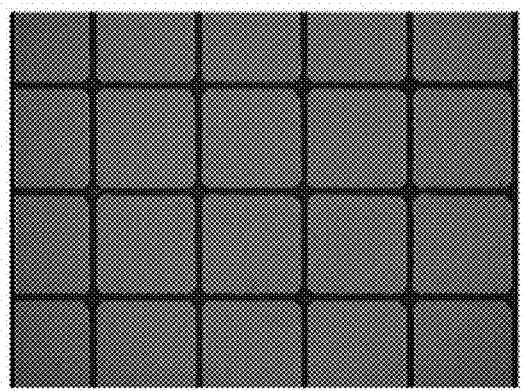
FIG. 3 is a microscope photograph (500× magnification) of a printed pattern (taken at the time of 100 printings) formed using the printing paste composition of Embodiment 5 of the present invention.
Figure 4A:
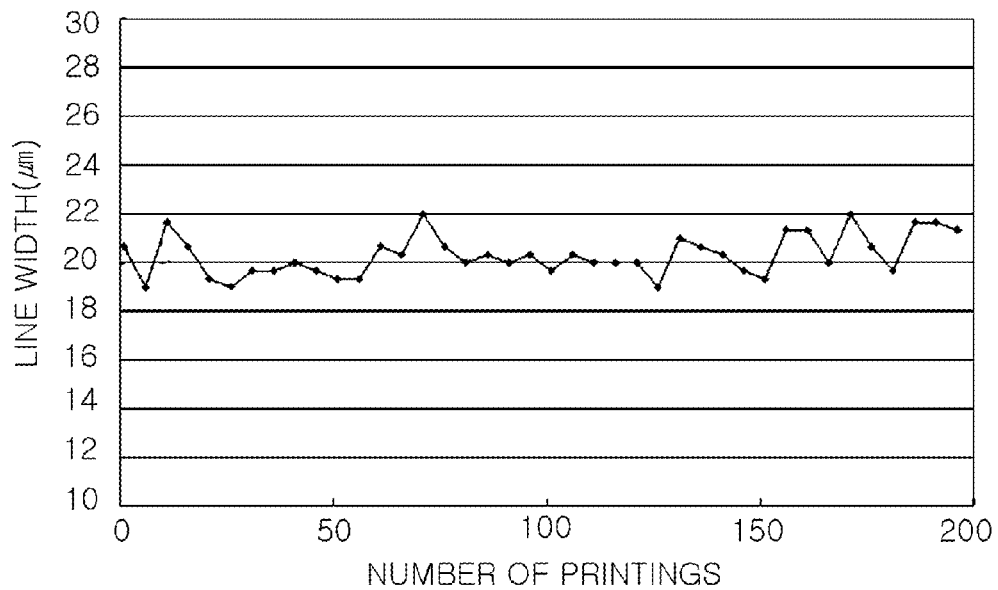
FIG. 4(A) is a graph illustrating a line width change depending upon the number of printings of a printed pattern formed using the printing paste composition of Embodiment 5 of the present invention.
Figure 4B:
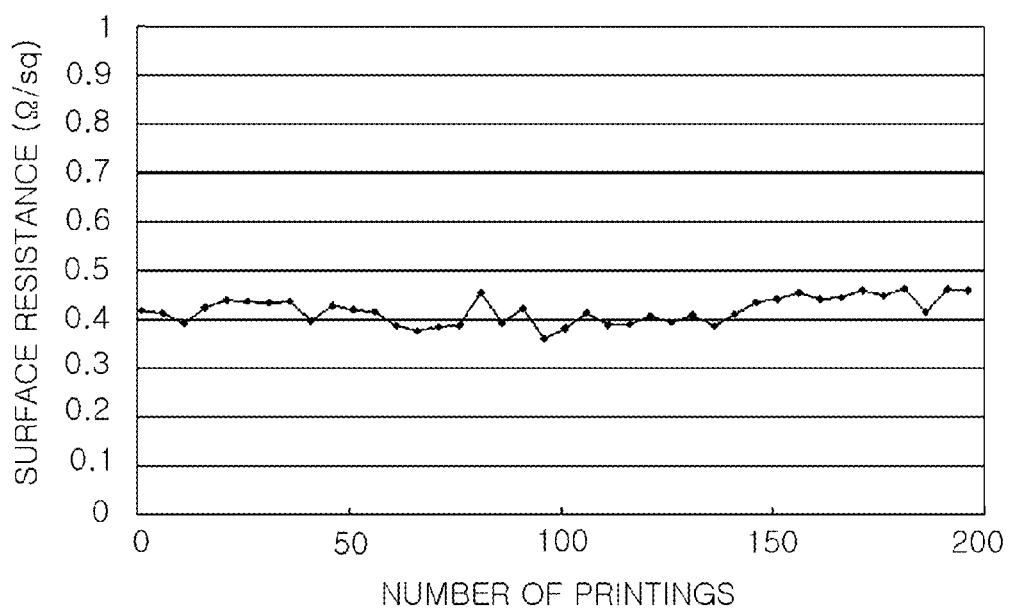
FIG. 4(B) is a graph illustrating a surface resistance change depending upon the number of printings of a printed pattern formed using the printing paste composition of Embodiment 5 of the present invention.

Unless explicitly described to the contrary, the word "comprise" and variations such as "comprises" or "comprising," will be understood to imply the inclusion of stated elements but not the exclusion of other elements.

Printing properties in a printed pattern printed using a printing paste composition may be different according to properties of a solvent included in a printing paste composition. In detail, the printing properties, particularly in continuous printing, are dependent on air drying of a solvent and blanket swelling properties due to a solvent.

Therefore, the present invention is provided to prevent a quality of printing from being deteriorated due to a paste solvent for an offset printing according to the related art being rapidly air dried on a cliché and/or a silicon blanket according to the related art being swollen by the solvent. According to an embodiment of the present invention, a printing paste composition comprising a paste solvent for printing is provided, which is capable of providing excellent quality printing by preventing a solvent being air dried on a cliché and a blanket from swelling due to the solvent.

According to an embodiment of the present invention, a printing paste composition including a solvent of which a boiling point is 250° C. or more and a swelling property SP is 5 or less.

Here, it will be understood that a printing paste composition having any generally well-known composition may be included in the present invention, as long as the printing paste composition includes a solvent having a boiling point of 250° C. or more and a swelling property SP of 5 or less. In general, a printing paste composition may comprise a metallic particle, a binder resin, a glass frit, and a solvent. A printing paste composition according to an embodiment of the present invention may comprise a metallic particle of 50 to 90 parts by weight, a binder resin of 2 to 20 parts by weight, a solvent of 2 to 50 parts by weight and a glass frit of 0.1 to 10 parts by weight.

A printing paste composition provided according to an embodiment of the present invention may be used for printing an electrode.

In the case of electrode printing, a printing paste composition used therefor may be mixed with metallic particles such that an electrode may have conductivity. As the metallic particle, any metallic particle well-known as being able to be mixed with a printing paste according to the related art may be used. For example, at least one metallic particle selected from a group consisting of silver, copper, nickel, gold and aluminum may be used, but the metallic particle is not limited thereto.

When the content of the metallic particle is less than 50 parts by weight, a conductive film may not be dense at the time of electrode printing and line height may become relatively low such that conductivity is deteriorated. When the content of the metallic particle exceeds 90 parts by weight, it is difficult to form a uniform paste composition or a viscosity thereof is relatively high, and thus, transferability may be reduced. In general, a metallic particle in a printing paste composition may have a particle size ranging from 200 nm to 30 μm, preferably, ranging 100 nm to 5 μm, in consideration of cohesion of the metallic particles and a dispersive property within the paste.

The binder resin may serve to maintain a pattern form while forming a pattern using the printing paste composition, and may be used for a printing paste composition. Any binder resin well-known in the art may be usable. As an example of the binder resin, a cellulose resin, a urethane resin, an acrylic resin, a vinyl resin, an ester resin, an epoxy resin, a novolac resin, a polyimide resin, or the like, may be used, but the present invention is not limited thereto.

When the binder resin content in the printing paste composition is less than 2 parts by weight, strength as a binder may not be sufficiently maintained, and furthermore, it may be difficult to match the oil modification thereof. When the binder resin content in the printing paste composition exceeds 20 parts by weight, electrode conductivity in a case of forming an electrode using the printing paste composition may be insufficient.

As the solvent, a solvent, which has a boiling point of 250° C. or more and a swelling property (SP) of 5 or less, in detail, the swelling property ranging from 0 to 5, may be used. The air drying and the swelling properties of the solvent are relevant to a boiling point and swelling properties of the solvent. That is, as a solvent having a boiling point of 250° C. or more and a swelling property (SP) of 5 or less is used, a reduced level in air drying and blanket swelling properties of the solvent may be relatively optimally controlled so as to obtain excellent printing characteristics. In detail, when the boiling point is less than 250° C., since the solvent in the paste on the cliché is relatively rapidly dried, replication properties (transferring properties) from the cliché to a silicon rubber may be degraded at the time of a continuous printing. Although an upper limit temperature for the boiling point of the solvent is not particularly limited, the boiling point of the solvent may be 320° C. or less, which is why the boiling point of a solvent is generally 320° C. or less. When the swelling property exceeds 5, the silicon blanket may be excessively swollen due to the solvent and the paste in the silicon blanket may be dried, thus causing a deterioration of setting properties on a substrate and a quality of printing. Furthermore, a printing characteristic in continuous printing may be deteriorated due to excessive swelling. In an embodiment of the present invention, "swelling/swelling properties" may refer to a value measured by dipping the silicon blanket having a lattice pattern with a pitch interval of 300 μm into the solvent and thus obtaining a value measured by using a prolonged length ratio of the swollen silicon blanket. For example, when a silicon blanket having a lattice pattern formed at a pitch interval of 300 μm in width and length directions is dipped in a solvent and left alone for 24 hours, a case in which the pitch interval in the width and length directions becomes 330 μm, that is, a case in which the lattice pattern is swollen from the original length of 300 μm and thus the length thereof is changed to 330 μm, may be defined as the swelling property SP, 10. A swelling property of 0 indicates that, for example, a silicon blanket having a lattice pattern formed therein at a pitch interval of 300 μm in the width and length directions is dipped and left alone in a solvent for 24 hours such that the pitch interval in the width and length directions is 300 μm, that is, there is no change in the length thereof.

A BCA generally used as a paste solvent for printing may have a boiling point of 245° C. and a swelling property of 3.4. On the other hand, as an example of a solvent including an ethylene oxide unit structure included in the BCA, diglyme, triglyme, tetraglyme, or the like may be used. A boiling point of diglyme is 16.2° C. and a swelling property SP thereof is 7.3. A boiling point of triglyme is 216° C. and a swelling property thereof is 2.7, while a boiling point of tetraglyme is 276° C. and a swelling property thereof is 1.4. Meanwhile, a boiling point of di(propylene glycol) dimethyl ether including the propylene oxide unit structure is 175° C. and a swelling property thereof is 21.9. From this, even for a similar structure, as the ethylene oxide unit structure is increased, the boiling point of the solvent is increased and the swelling properties are reduced, meanwhile, the propylene oxide unit structure may tend to increase both of the boiling points and the swelling properties.

In addition, as the printing paste solvent, a solvent which has excellent miscibility with the resin binder being a component constituting a printing paste and which is not phase separated in the paste composition should be used.

Therefore, in consideration of air drying properties, blanket swelling properties and the miscibility with a resin binder; a solvent having a boiling point of 250° C. or more, in detail, ranging from 250° C. to 320° C. and a swelling property SP of 5 or less, in detail, ranging from 0 to 5, may be used. In detail, as the solvent, tetraglyme, pentaglyme, or a mixture thereof may be used. In addition, a solvent having a boiling point of 250° C. or more and a swelling property SP of 5 or less, in detail, tetraglyme, pentaglyme, or a mixture thereof may be used together with BCA solvent.

That is, a solvent having a boiling point of 250° C. or more and a swelling property SP of 5 or less, that is, tetraglyme, pentaglyme, or a mixture thereof may be used as a mixture solvent mixed with the BCA solvent. When tetraglyme and/or pentaglyme is used together with the BCA, the mixture ratio by weight of these solvents is not particularly limited, and thus the mixing may be performed at any mixture ratio by weight of these solvents. In the meantime, in terms of the excellent setting properties and the separation properties (off properties) in the printing paste composition and the balance therebetween and continuous printing properties, the tetraglyme and/or pentaglyme and the BCA may be mixed to be in the range of 0.01 to 100 ratio by weight, more specifically, 0.5 to 100 ratio by weight with regard to (tetraglyme and/or pentaglyme)/(BCA).

Further, when tetraglyme and pentaglyme are used together, the mixture ratio by weight of tetraglyme and pentaglyme is not particularly limited, and thus the mixing thereof may be performed at any part by weight. In the meantime, in terms of the balance between the setting properties and the separation properties (off properties) in the printing paste composition, the mixture ratio may range from 0.1 to 10 ratio by weight of (tetraglyme)/(pentaglyme). In more detail, since the SP of tetraglyme is 1.4 and the SP of pentaglyme is 0.4, as the content of pentaglyme is increased, the setting properties may be improved, and as the content of tetraglyme is increased, the separation properties may be improved. Meanwhile, both the setting properties and the separation properties are required and also in terms of the balance between these both properties, the mixture ratio may range from 0.1 to 10 ratio by weight of (tetraglyme)/(pentaglyme).

The content of the solvent may range from 2 to 50 parts by weight, more specifically, from 2 to 20 parts by weight. When the content of the solvent is less than 2 parts by weight, the viscosity of paste is relatively high, such that it may not be manufactured as a paste. When the content of the solvent exceeds 50 parts by weight, the paste viscosity is relatively too low such that a printing process cannot be performed or a height of a conductive pattern is relatively low at the time of firing after printing such that conductivity may be deteriorated. When tetraglyme and/or pentaglyme are used together with BCA, the content of a mixture solvent including tetraglyme and/or pentaglyme and BCA may range from 2 to 50 parts by weight, more specifically, from 2 to 20 parts by weight.

In order to improve adhesive force between a substrate on which the printing paste composition is printed, for example, a glass substrate and printed paste, glass frit may be mixed with a printing paste composition. When the content of glass frit is less than 0.1 parts by weight, the adhesive force between the substrate and the paste may be insufficient, and when the content of glass frit exceeds 10 parts by weight, conductivity properties in an electrode which is formed with a printing paste composition may be insufficient.

According to necessity, a generally mixable additive to a printing paste composition, for example, a dispersant, a pigment, a curing agent, or the like, may be added to the printing paste composition.

In the case of the solvent according to an embodiment of the present invention, air drying of the solvent on the cliché and the swelling of a blanket due to the solvent may be suppressed by a relatively high boiling point and a relatively low swelling property at the time of offset printing. Therefore, even in the case of multiple repetitive printings using the printing paste composition including such solvent, excellent printing properties may be exhibited. That is, linearity and clarity may be improved in the printed pattern, and furthermore, line height may not be reduced, and line width deviation may be relatively low and a surface resistance may be constant in the printed pattern. The printing paste composition according to an embodiment of the present invention may be used for a display panel, in detail, electrode printing of a plasma display panel, electrode printing for a capacitive touch screen, solar cell electrode printing, thin film transistor (TFT) electrode printing, printed battery electrode printing, electrode printing for an organic light emitting diode (OLED), or the like.

MODE FOR INVENTION

Hereinafter, embodiments of the present invention will be described in detail. The following embodiments of the present invention are provided by way of examples, but the present invention is not limited thereto.

Embodiments 1-14

A silver particle (Dmax 2 μm, D90 1 μm) of 82 parts by weight, glass frit of 2 parts by weight, polyester resin of 7 parts by weight, and a solvent of 9 parts by weight (See the following table 1) were mixed with each other, and then, were kneaded using a 3-roll mill for 30 minutes such that paste components were uniformly dispersed to thereby manufacture a silver paste composition according to Embodiments 1 to 13. As the solvent in Embodiments 1 to 13, a solvent in the following table 1 was each used.

A lattice form electrode pattern shown in FIG. 1 or the like was printed on a glass substrate by using the silver paste composition manufactured in the above-mentioned Embodiments 1 to 13 and a 50 inch intaglio offset printing device. The pattern was determined to have a line width of 20 μm, a pitch of 300 μm and a line height of 2 μm to 3 μm. After that, the printed electrode pattern was fired at 650° C. for three minutes.

The line width, line height and linearity of the formed printed pattern were confirmed using a microscope, and the surface resistance (conductivity) was measured and evaluated by a surface resistance meter.

[Linearity Evaluation]

With regard to the linearity of the pattern on a microscope photograph of the printed pattern, a case in which line width deviation in the printed pattern is 3 μm or less was evaluated as O, a case in which the line width deviation in the printed pattern is 3 μm or more was evaluated as Δ, and a shorted-circuit case was evaluated as X.

[Continuous Printing Property Evaluation]

With regard to continuous printing properties of the pattern, a case in which the printed pattern satisfies the linearity and no defects occur on the entire printing surface and thus a surface resistance is measurable, was evaluated as 0, and a case in which the surface resistance measurement is partially valid was evaluated as Δ, and a case in which the surface resistance measurement on the entire printing surface is unavailable was evaluated as X.

A microscope photograph (magnification ×500) of a printed pattern formed at the time of 100-time continuous printing by using the silver paste composition obtained through Embodiments 4 through 13, and a line width change and a surface resistance change according to the printing repetitive number of the printed pattern are shown in FIGS. 1 to 16.

The printed pattern formed using the printing paste composition obtained through Embodiments 4, 5 and 7 to 13 of the present invention had little swelling in the blanket due to the solvent, even in the case of an increase in the number of printings as shown in FIGS. 1 to 4 and 7 to 16, and thus, line width deviation was relatively small, constant surface resistance was provided, and the reduction in a line height was not shown. Moreover, the printed pattern exhibited excellent linearity.

Figure 5:
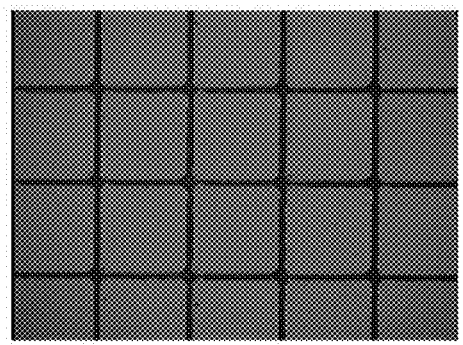
FIG. 5 is a microscope photograph (500× magnification) of a printed pattern (taken at the time of 100 printings) formed using the printing paste composition of Embodiment 6 of the present invention.
Figure 6A:
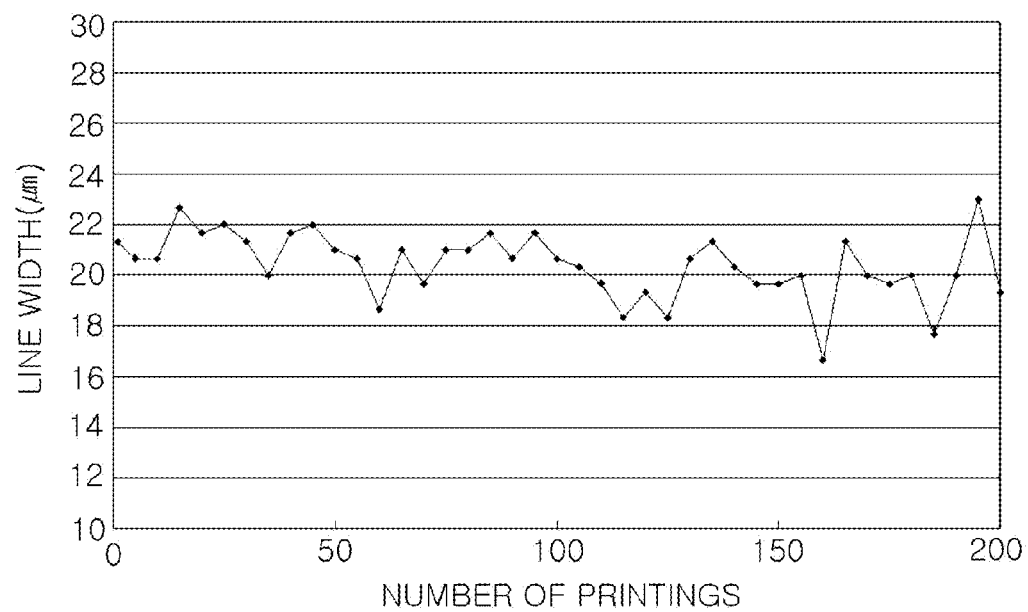
FIG. 6(A) is a graph illustrating a line width change depending upon the number of printings of a printed pattern formed using the printing paste composition of Embodiment 6 of the present invention.
Figure 6B:
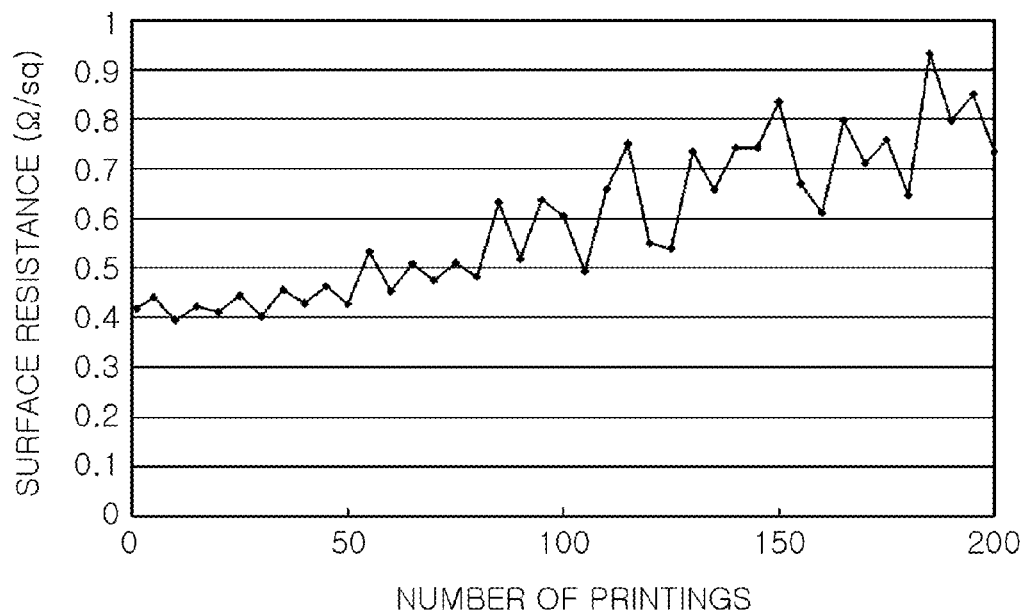
FIG. 6(B) is a graph illustrating a surface resistance change depending upon the number of printings of a printed pattern formed using the printing paste composition of Embodiment 6 of the present invention.
Figure 7A:
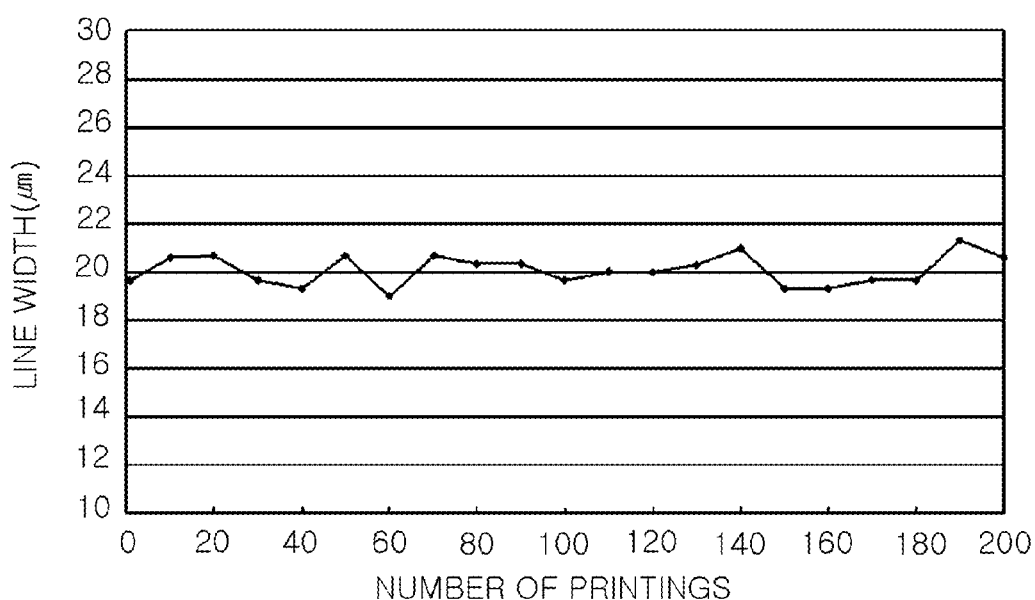
FIG. 7(A) is a graph illustrating a line width change depending upon the number of printings of a printed pattern formed using the printing paste composition of Embodiment 7 of the present invention.
Figure 7B:
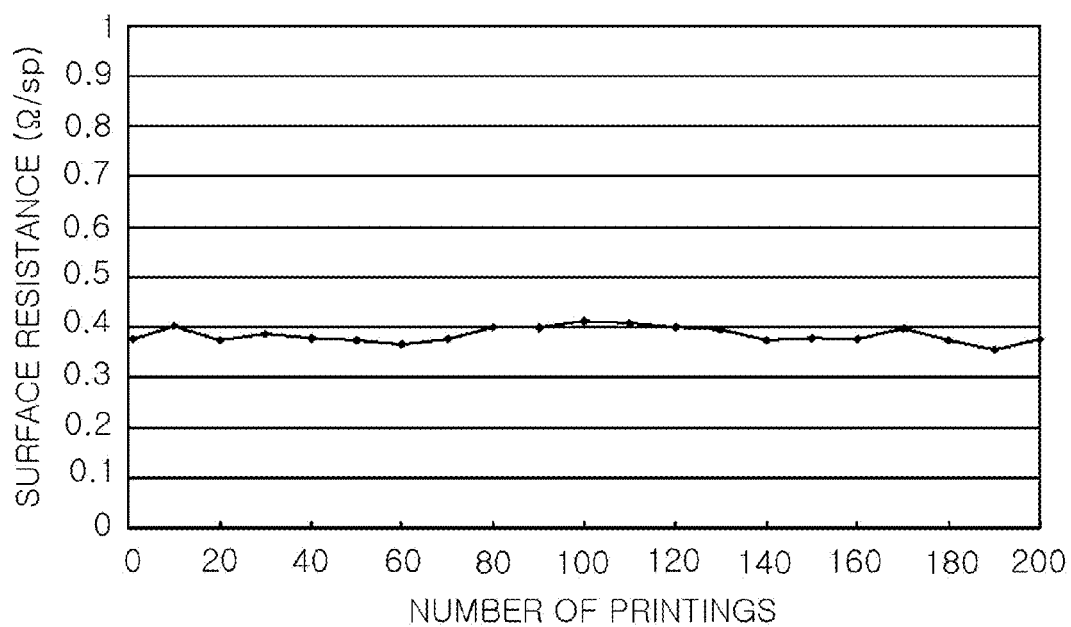
FIG. 7(B) is a graph illustrating a surface resistance change depending upon the number of printings of a printed pattern formed using the printing paste composition of Embodiment 7 of the present invention.
Figure 8:
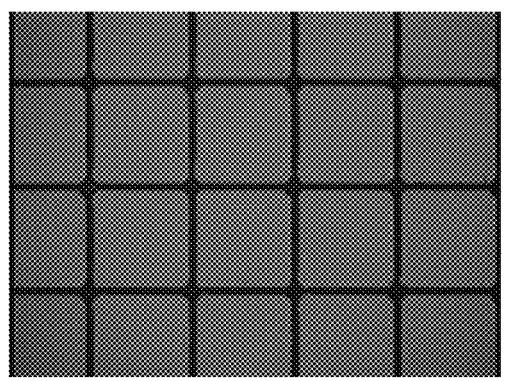
FIG. 8 is a microscope photograph (500× magnification) of a printed pattern (taken at the time of 100 printings) formed using the printing paste composition of Embodiment 8 of the present invention.
Figure 9A:
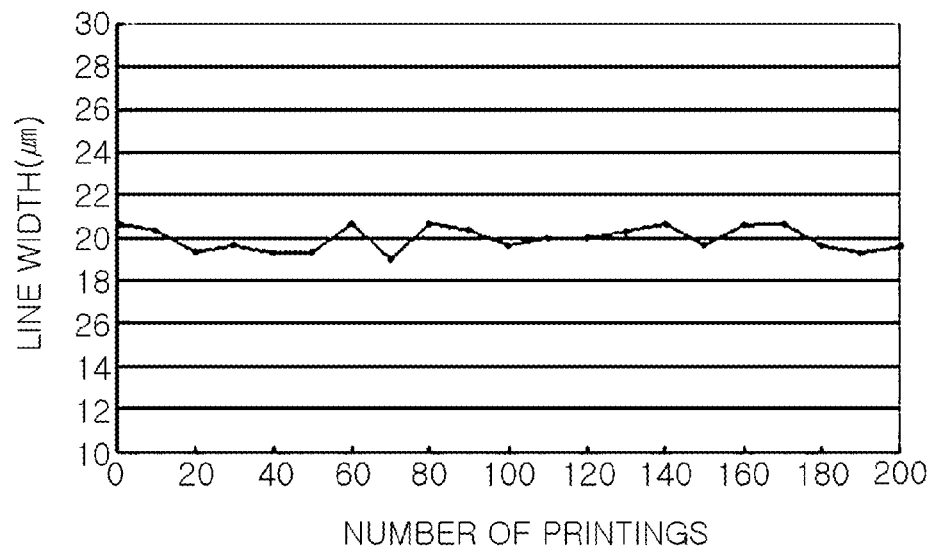
FIG. 9(A) is a graph illustrating a line width change depending upon the number of printings of a printed pattern formed using the printing paste composition of Embodiment 8 of the present invention.
Figure 9B:
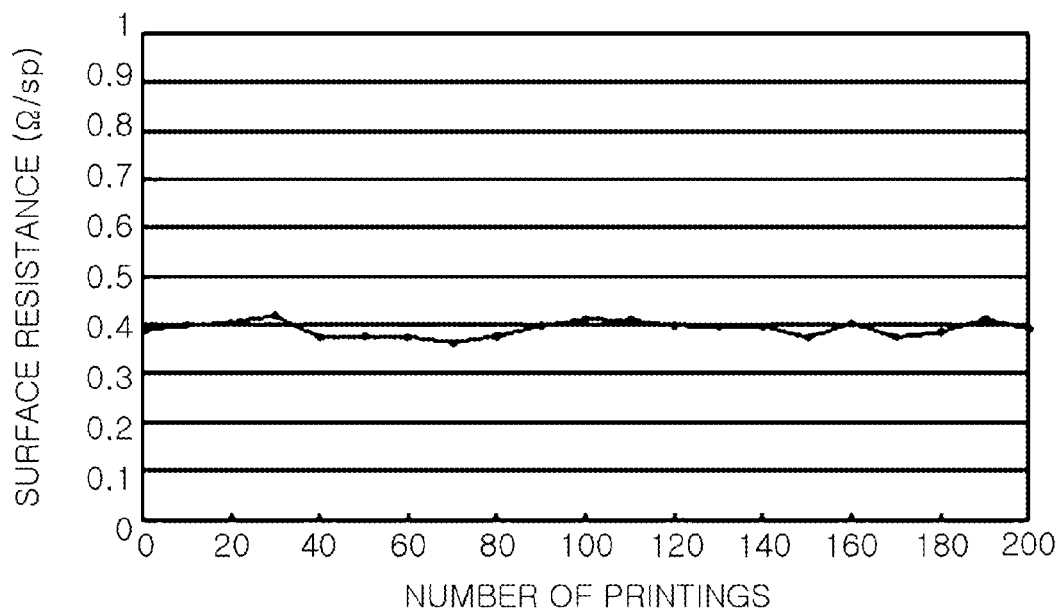
FIG. 9(B) is a graph illustrating a surface resistance change depending upon the number of printings of a printed pattern formed using the printing paste composition of Embodiment 8 of the present invention.
Figure 10A:
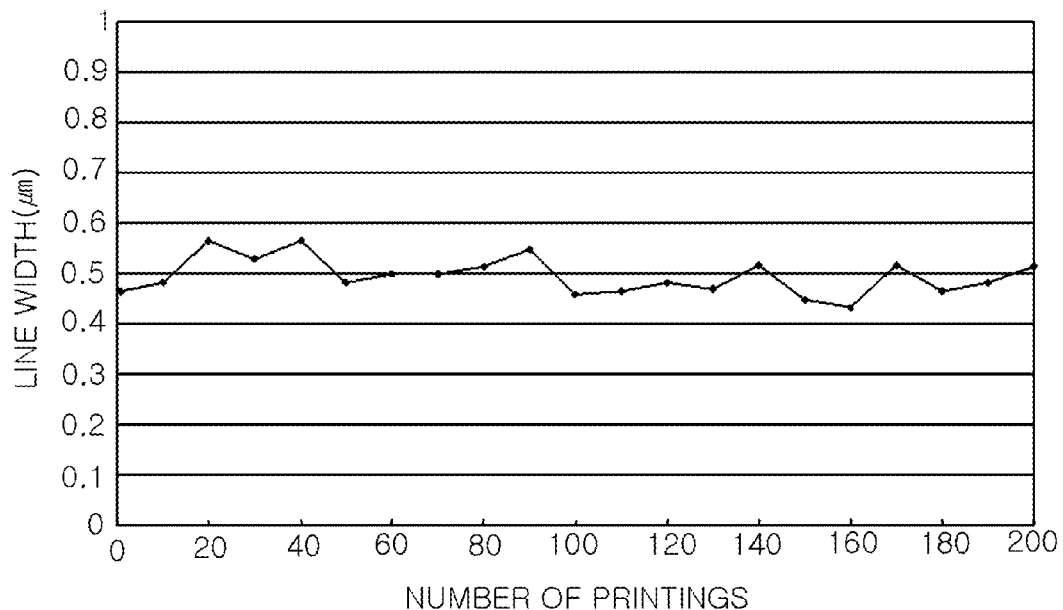
FIG. 10(A) is a graph illustrating a line width change depending upon the number of printings of a printed pattern formed using the printing paste composition of Embodiment 9 of the present invention.
Figure 10B:
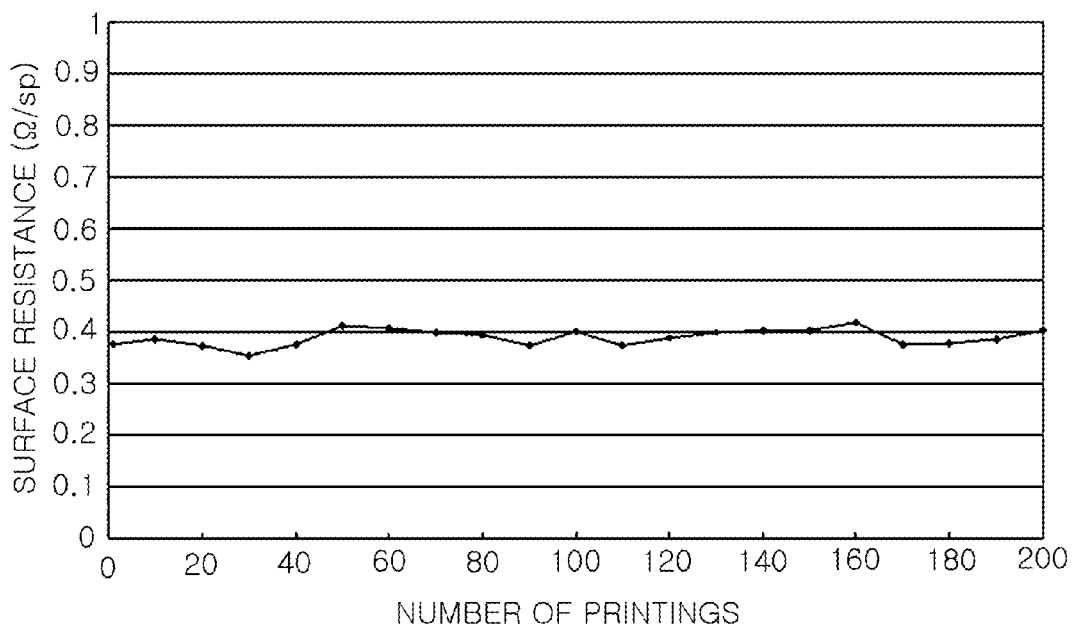
FIG. 10(B) is a graph illustrating a surface resistance change depending upon the number of printings of a printed pattern formed using the printing paste composition of Embodiment 9 of the present invention.
Figure 11A:
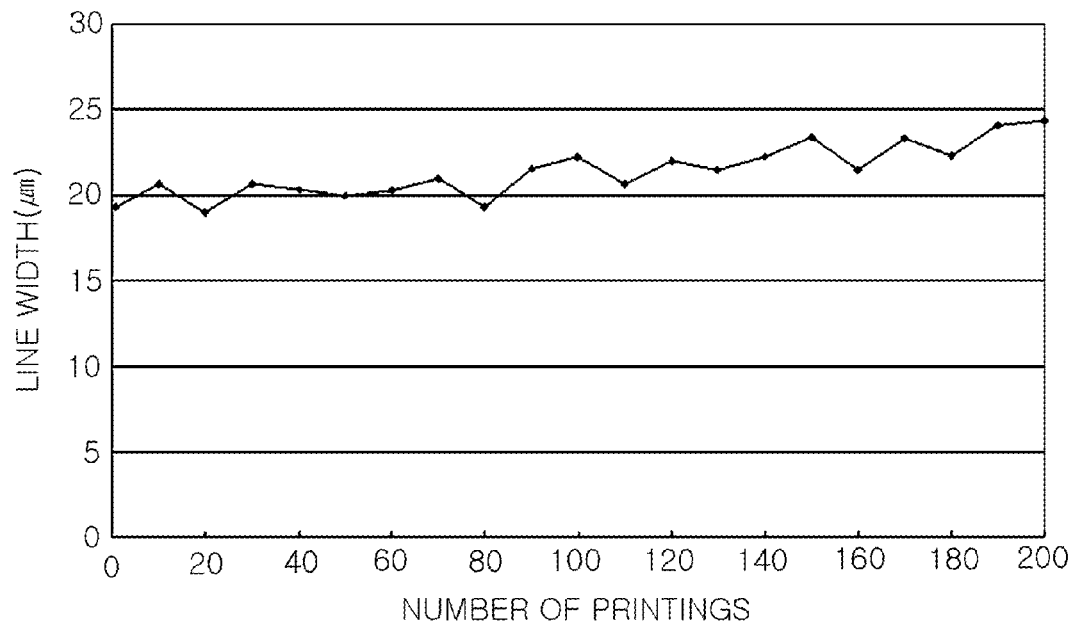
FIG. 11(A) is a graph illustrating a line width change depending upon the number of printings of a printed pattern formed using the printing paste composition of Embodiment 10 of the present invention.
Figure 11B:
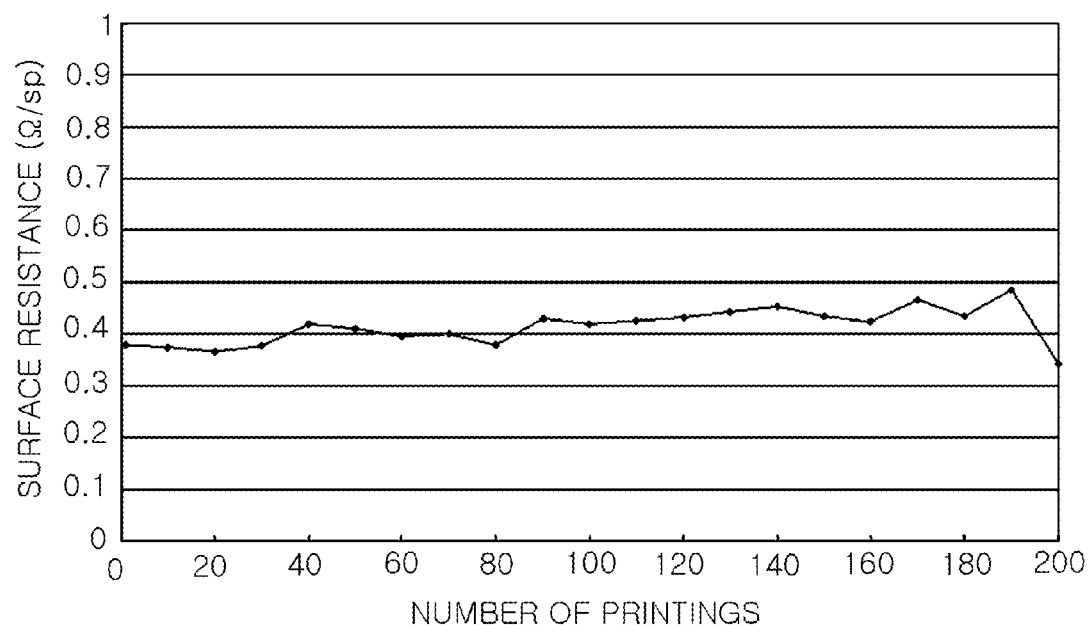
FIG. 11(B) is a graph illustrating a surface resistance change depending upon the number of printings of a printed pattern formed using the printing paste composition of Embodiment 10 of the present invention.
Figure 12:
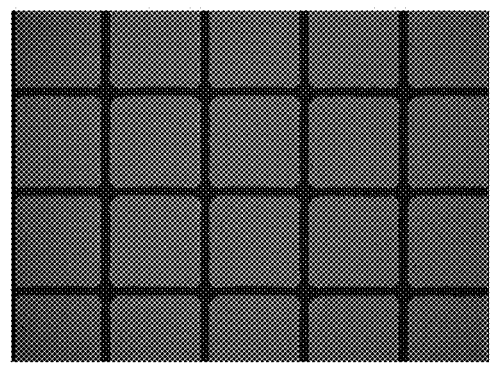
FIG. 12 is a microscope photograph (500× magnification) of a printed pattern (taken at the time of 100 printings) formed using the printing paste composition of Embodiment 11 of the present invention.
Figure 13A:
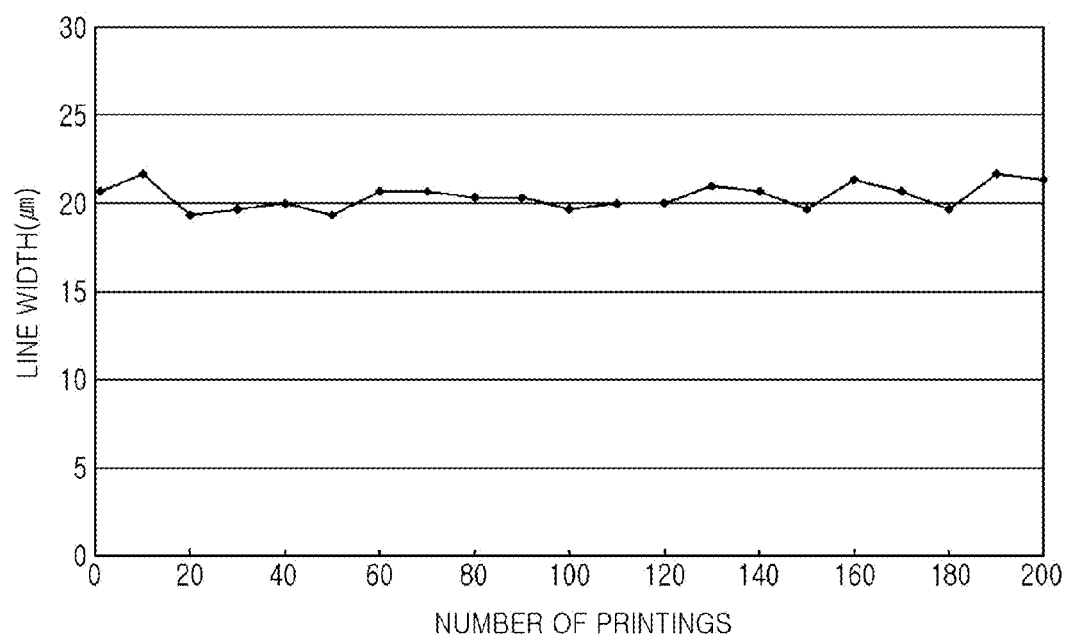
FIG. 13(A) is a graph illustrating a line width change depending upon the number of printings of a printed pattern formed using the printing paste composition of Embodiment 11 of the present invention.
Figure 13B:
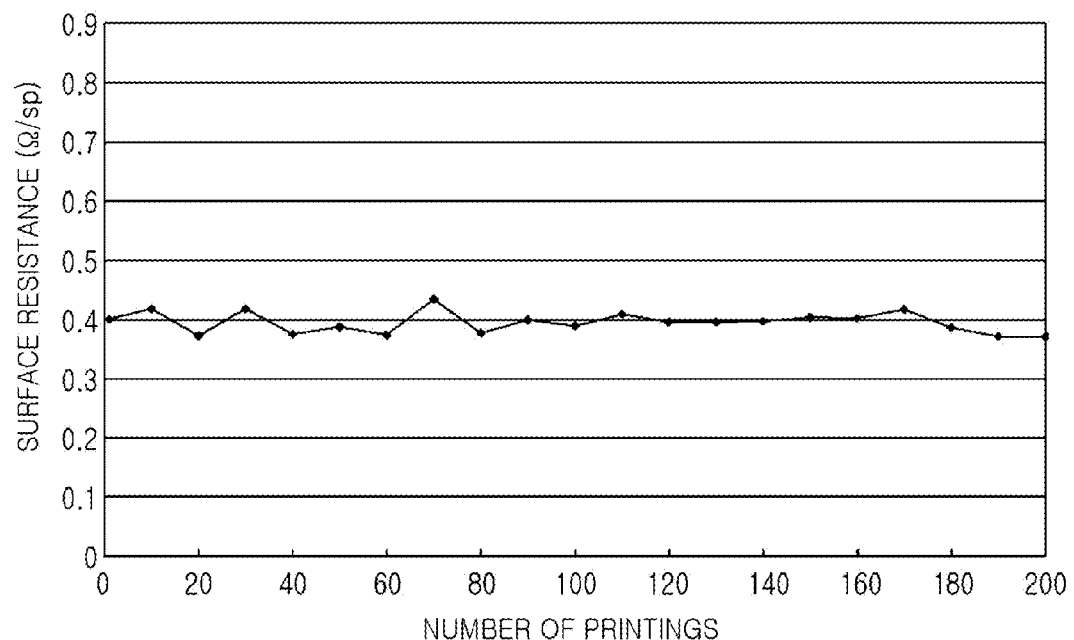
FIG. 13(B) is a graph illustrating a surface resistance change depending upon the number of printings of a printed pattern formed using the printing paste composition of Embodiment 11 of the present invention.
Figure 14:
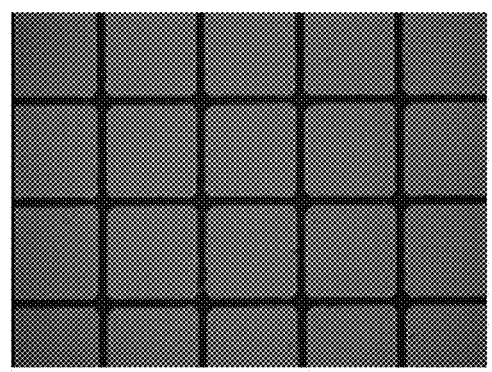
FIG. 14 is a microscope photograph (500× magnification) of a printed pattern (taken at the time of 100 printings) formed using the printing paste composition of Embodiment 12 of the present invention.
Figure 15A:
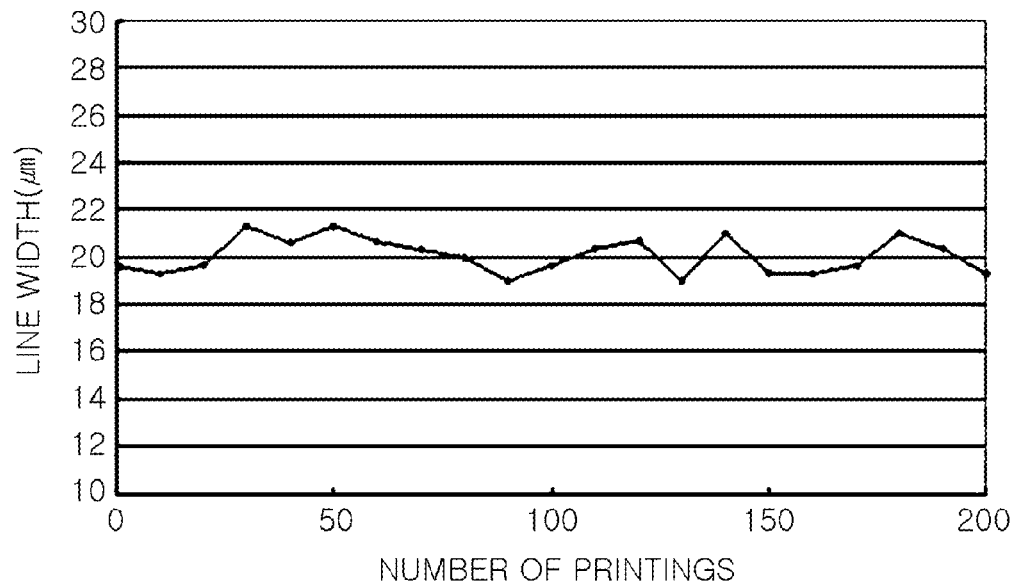
FIG. 15(A) is a graph illustrating a line width change depending upon the number of printings of a printed pattern formed using the printing paste composition of Embodiment 12 of the present invention.
Figure 15B:
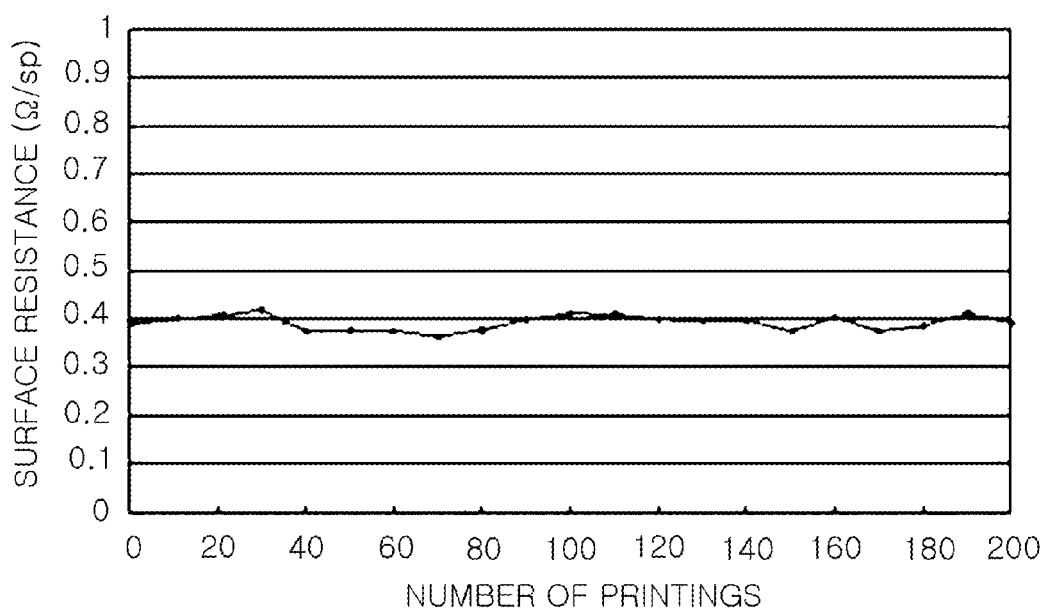
FIG. 15(B) is a graph illustrating a surface resistance change depending upon the number of printings of a printed pattern formed using the printing paste composition of Embodiment 12 of the present invention.
Figure 16A:
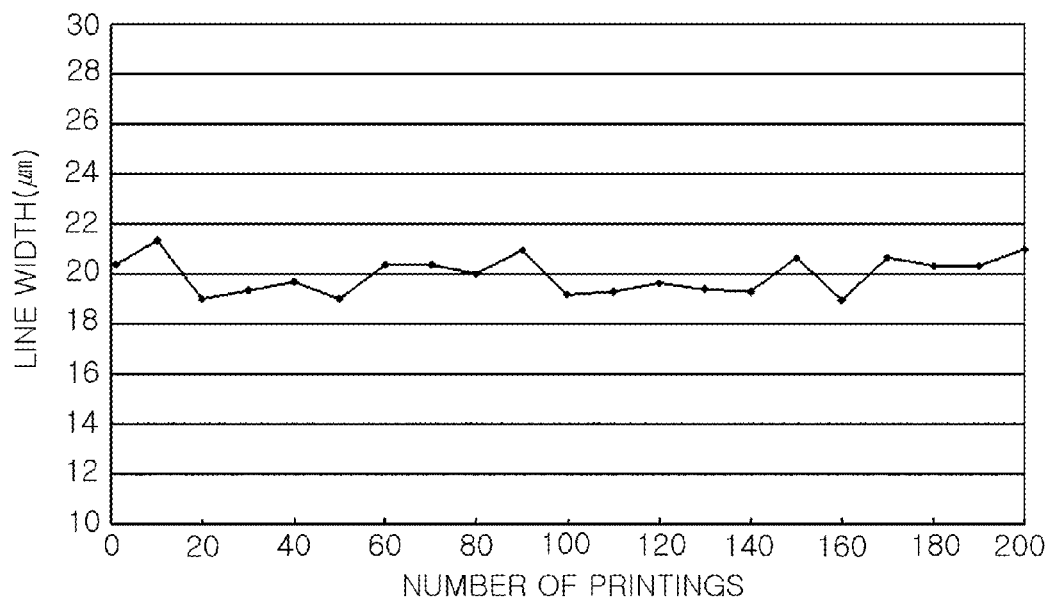
FIG. 16(A) is a graph illustrating a line width change depending upon the number of printings of a printed pattern formed using the printing paste composition of Embodiment 13 of the present invention.
Figure 16B:
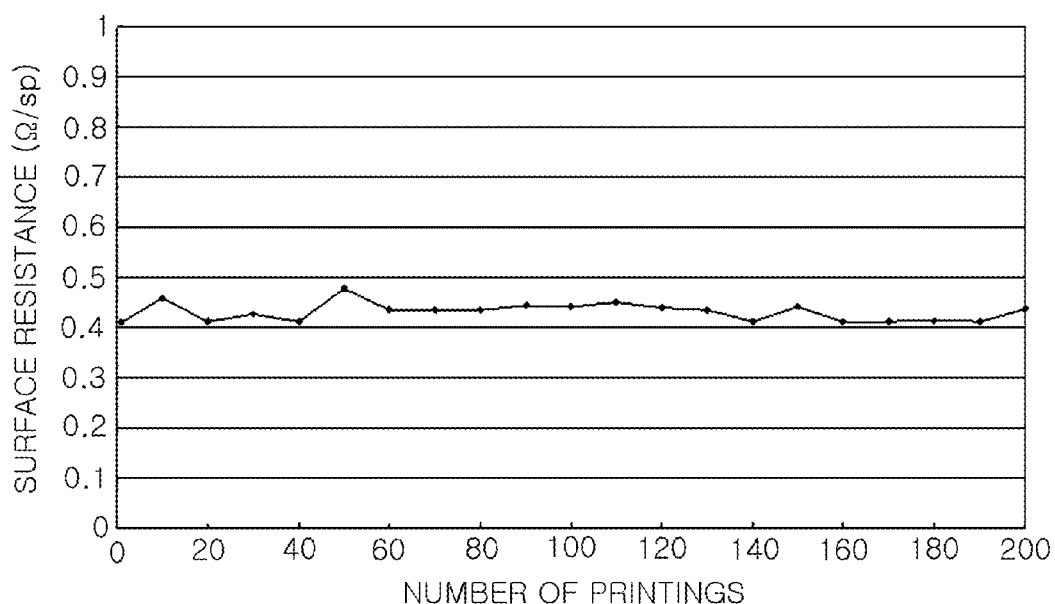
FIG. 16(B) is a graph illustrating a surface resistance change depending upon the number of printings of a printed pattern formed using the printing paste composition of Embodiment 13 of the present invention.

Meanwhile, in the printed pattern formed using the printing paste composition including a BCA solvent, obtained through Embodiment 6, as the number of printings was increased, the swelling of blanket due to the solvent become great, that is, the line width deviation in the printed pattern was increased, the line height was reduced and the linearity was also lowered, as shown in FIGS. 5, 6(A) and 6(B).

As such, in a 50 inch continuous printing property test result, in the printed pattern formed by the silver paste composition including BCA, the swelling in an effective printing unit was great and thus the line width deviation was relatively high, but it resulted in the printed pattern formed by a composition including tetraglyme and/or pentaglyme, in which constant surface resistance (conductivity) during 100-time continuous printing was shown and the line width deviation was relatively small, and thus it could be confirmed that an electrode pattern property was good.

TABLE 1

| | Solvent | BP (° C.) | Swelling Property (SP) | Continuous Printing Property | Linearity |
|---|---|---|---|---|---|
| Embodiment 1 | Diglyme | 162 | 7.3 | X | X |
| Embodiment 2 | Diglyme-2 | 175 | 21.9 | X | X |
| Embodiment 3 | Triglyme | 216 | 2.7 | X | X |
| Embodiment 4 | Tetraglyme | 276 | 1.4 | 0 | 0 |
| Embodiment 5 | Pentaglyme | >300 | 0.4 | 0 | 0 |
| Embodiment 6 | BCA | 245 | 3.4 | Δ | Δ |
| Embodiment 7 | TG + PG (1:2 ratio by weight) | — | 0.6 | 0 | 0 |

TABLE 1-continued

| | Solvent | BP (° C.) | Swelling Property (SP) | Continuous Printing Property | Linearity |
|---|---|---|---|---|---|
| Embodiment 8 | TG + PG (1:1 ratio by weight) | — | 0.8 | 0 | 0 |
| Embodiment 9 | TG + PG (2:1 ratio by weight) | — | 1.2 | 0 | 0 |
| Embodiment 10 | TG + BCA (1:10 ratio by weight) | — | 3.2 | 0 | 0 |
| Embodiment 11 | TG + BCA (1:1 ratio by weight) | — | 2.2 | 0 | 0 |
| Embodiment 12 | PG + BCA (1:1 ratio by weight) | — | 1.6 | 0 | 0 |
| Embodiment 13 | TG + BCA (10:1 ratio by weight) | — | 1.6 | 0 | 0 |
| Embodiment 14 | Tetraethylene Glycol monomethyl Ether | 126 | 0.9 | — | — |

(1) Embodiment 2: diglyme-2: di(propylene glycol)dimethyl ether
(2) Embodiment 7: mixture solvent of 1:2 ratio by weight of tetraglyme and pentaglyme
(3) Embodiment 8: mixture solvent of 1:1 ratio by weight of tetraglyme and pentaglyme
(4) Embodiment 9: mixture solvent of 2:1 ratio by weight of tetraglyme and pentaglyme
(5) Embodiment 10: mixture solvent of 1:10 ratio by weight of tetraglyme and BCA
(6) Embodiment 11: mixture solvent of 1:1 parts by weight of tetraglyme and BCA
(7) Embodiment 12: mixture solvent of 1:1 ratio by weight of pentaglyme and BCA
(8) Embodiment 13: mixture solvent of 10:1 ratio by weight of tetraglyme and BCA
(9) Embodiment 14: Tetraethylene glycol monomethyl ether were not manufactured as a paste due to miscibility and solubility with a binder resin.

The invention claimed is:

1. A printing paste composition comprising:
   a metallic particle of 50 to 90 parts by weight, a binder resin of 2 to 20 parts by weight, a solvent of 2 to 50 parts by weight having a boiling point of 250° C. or more and a swelling property of 5 or less, and a glass frit of 0.1 to 10 parts by weight,
   wherein the solvent is at least one solvent selected from a group consisting of tetraglyme and pentaglyme.

2. The printing paste composition of claim 1, wherein the solvent is used together with a butyl carbitol acetate (BCA) solvent.

3. The printing paste composition of claim 2, wherein the at least one solvent selected from the group consisting of the tetraglyme and the pentaglyme, and the BCA solvent, are mixed in the range of 0.01 to 100 ratio by weight with regard to (the at least one solvent selected from the group consisting of tetraglyme and pentaglyme)/(BCA).

4. The printing paste composition of claim 1, wherein the metallic particle is at least one metallic particle selected from a group consisting of silver, copper, nickel, gold and aluminum.

* * * * *